United States Patent [19]

Harbison et al.

[11] 4,240,177
[45] Dec. 23, 1980

[54] CONNECTOR FOR WINDSHIELD WIPER BLADE

[75] Inventors: William H. Harbison; Michael G. Mohnach, both of Valparaiso, Ind.

[73] Assignee: The Anderson Company of Indiana, Gary, Ind.

[21] Appl. No.: 32,563

[22] Filed: Apr. 23, 1979

[51] Int. Cl.³ .............................................. B60S 1/40
[52] U.S. Cl. ............................ 15/250.32; 24/255 SL; 292/353
[58] Field of Search ...................... 15/250.32, 250.31; 292/353; 24/255 SL

[56] References Cited

U.S. PATENT DOCUMENTS

| | | | |
|---|---|---|---|
| 3,750,227 | 8/1973 | Hayhurst et al. | 15/250.32 |
| 3,866,259 | 2/1975 | Nichols et al. | 15/250.32 |

*Primary Examiner*—Christopher K. Moore
*Attorney, Agent, or Firm*—Wegner, Stellman, McCord, Wood & Dalton

[57] ABSTRACT

A windshield wiper blade connector (20) is provided for connecting a plastic windshield wiper blade (14) to the side pin (61) of a side pin wiper arm. The connector includes a U-shaped spring (52) seated in a cavity (32) in the bridge of a wiper blade (14). Intermediate portions of the sides of the U-shaped spring (52) intersect in a chordal fashion the transverse pin-receiving aperture (42) in the yoke (16) of the blade. The pin (61) with a reduced diameter portion (62) is inserted in the aperture (42) so that the intermediate portions (55,57) of the U-shaped spring (52) will seat in the reduced diametered portion (62) of the pin (61) to lock the blade (14) to the arm. The U-shaped spring (52) can be flexed to release the pin (61) from the blade (14).

4 Claims, 5 Drawing Figures

U.S. Patent  Dec. 23, 1980  4,240,177
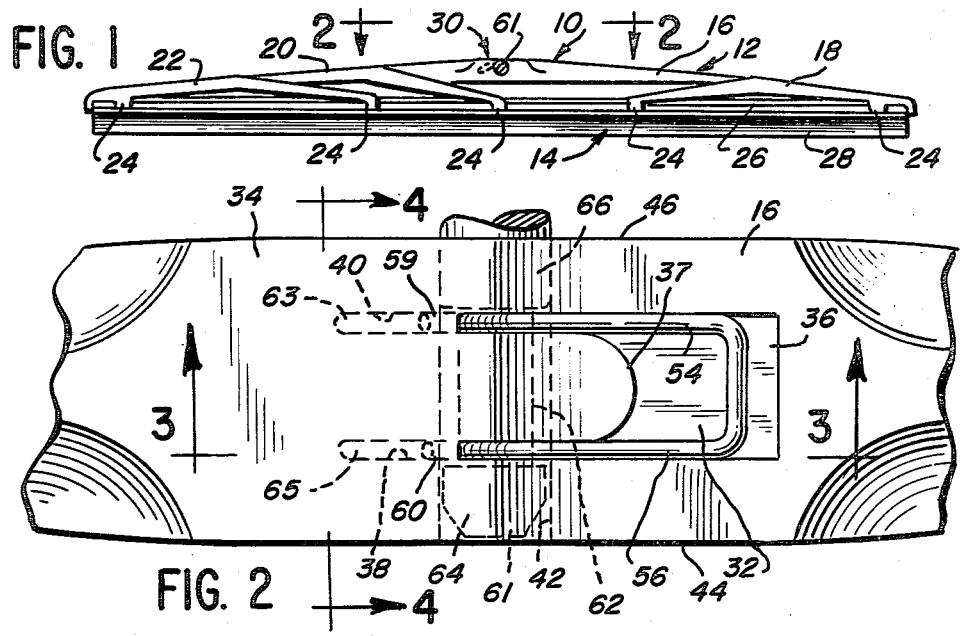
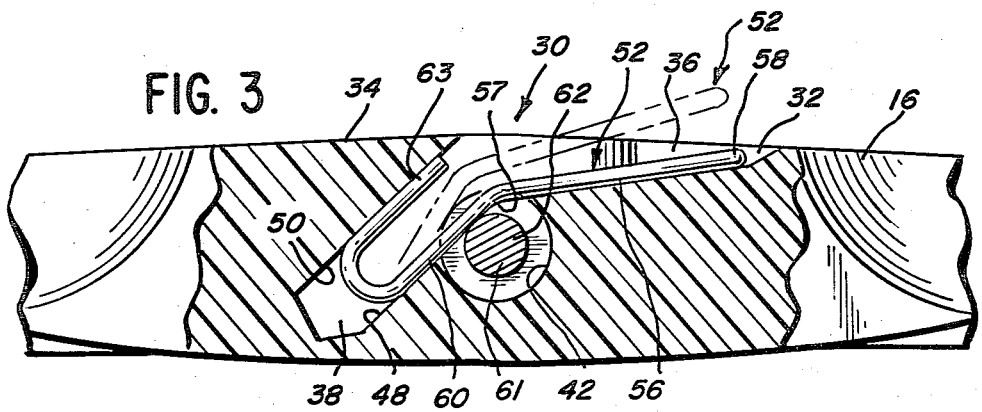
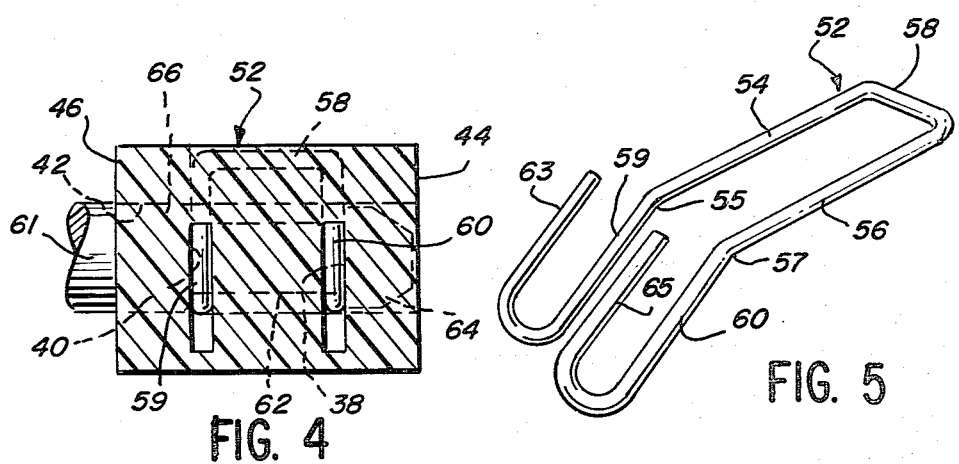

CONNECTOR FOR WINDSHIELD WIPER BLADE

DESCRIPTION

1. Technical Field

This invention relates to side mounted windshield wiper blades and, more particularly, to a connector on the blade for positively locking the blade to the side pin of a side pin windshield wiper arm.

2. Background Art

Many connectors have been designed and patented for connecting a windshield wiper blade to the side pin of a side pin windshield wiper arm wherein the side pin has a reduced diameter intermediate portion bounded by an enlarged outer end and an enlarged inner end portion of the pin. Single spring clips have been provided for seating in the groove or reduced diameter portion for retaining the blade on the arm. One such device is shown and described in U.S. Pat. No. 3,750,227 in the name of George Hayhurst et al wherein a single hairspring-type pin is seated in a slot in the yoke of a wiper blade and has a portion bridging across the aperture in the yoke so as to seat in the reduced diameter portion of the pin on the arm. The single pin has been less satisfactory in that it has been known to work loose and release the blade from the arm and, in some instances, the single spring has ruptured, once again releasing the blade from the arm.

Another prior art device has a flat spring traversing the aperture in the bridge, which spring seats in the reduced diameter portion to hold the blade to the arm. In this version, the spring is such that it cannot give laterally of the bridge and, therefore, sometimes will not seat in the reduced diameter portion whereupon the blade can work itself loose from the arm.

A still further prior art device is shown in U.S. Pat. No. 3,866,259 in the name of E. F. Nichols et al, assigned to the common assignee of the present application, wherein a U-shaped spring is secured in the channel-shaped metal yoke of the superstructure of a blade so that an intermediate shaped portion of the spring intersects the aligned apertures between the side walls of a channel and will seat in the reduced diameter portion of the pin to secure the blade on the arm. This patent requires special attaching means to secure the U-shaped spring in the channel-shaped yoke which adds cost to the blade and is not adaptable for use on a molded plastic yoke.

DISCLOSURE OF INVENTION

To overcome the problems of the prior art, an improved U-shaped spring is provided for attachment in a yoke of a blade for improved connection of the blade to a reduced diameter pin carried by the end of a wiper arm. The U-shaped spring has the ends of each leg doubled back upon itself as an anchoring portion so that when the U-shaped spring is seated in a cavity in the back of the wiper blade, the doubled back portions of the legs will bite into the walls of the cavity to lock the spring in the bridge of the blade. The cavity is of such a dimension that the whole spring is recessed below the surface of the yoke so as to prevent accidental disengagement of the yoke from the pin. The intermediate portion of the spring overlaps the aperture in the yoke along substantially a chord of the aperture such that when a pin is seated in the aperture in the yoke, the two legs of the "U" engage in the reduced diameter portion with one leg bearing against one enlarged end portion and the other leg engaging with the other enlarged end portion of the reduced diameter portion of the pin. In this way, even if one leg of the spring fails, the other leg will serve to retain the pin in the aperture so that the blade will not be lost and the driver will not be left in the precarious position of having an inoperative windshield wiper.

BRIEF DESCRIPTION OF DRAWINGS

FIG. 1 is an elevational view of a windshield wiper blade incorporating the connector of the present invention;

FIG. 2 is an enlarged partial view taken along the lines 2—2 of FIG. 1;

FIG. 3 is an enlarged partial cross-sectional view taken along the lines 3—3 of FIG. 2;

FIG. 4 is an enlarged cross-sectional view taken along the lines 4—4 of FIG. 2; and, FIG. 5 is a perspective view of a spring of the present invention removed from the cavity in the yoke.

BEST MODE FOR CARRYING OUT THE INVENTION

Referring to the drawings, a windshield wiper blade assembly 10 is illustrated in FIG. 1 and includes a pressure-distributing superstructure 12 operatively connected with a wiper blade 14. The superstructure 12, as illustrated, comprises a yoke 16 pivotally connected at one end portion to an intermediate portion of a secondary yoke 18 and is pivotally connected at the other end portion to a link 20, which link 20 has one end portion slidably connected to the wiper blade and has the other end portion pivotally connected to the intermediate portion of a secondary yoke 22. The yokes 18 and 22 and the link 20 have facing claw members 24 at the ends thereof which slidably engage with the backing strip 26 embedded in the sides of the rubber wiping element 28 as is fairly conventional construction being shown in U.S. Pat. No. Re. 29,392 in the name of J. P. Moorhead et al. The yoke 16 has a connector portion 30 roughly centrally located with respect to the blade 14, which connector 30 is shown more in detail in FIGS. 2 through 5, inclusive.

The connector 30 includes a cavity 32 molded into the yoke 16 through the top wall 34 thereof. The cavity 32 has a rectangular portion 36 on one end and becomes bifurcated into a pair of spaced apart channels 38 and 40 which are angled downwardly and away from the rectangular portion 36. The rectangular portion 36 of the cavity 32 has a circular wall 37 bridging between the spaced apart channels 38 and 40. The channels 38 and 40 cut across and open into a transverse aperture 42 formed through the yoke 16. The aperture 42 has an axis extending perpendicular to the side walls 44 and 46 of the yoke 16. The channels 38 and 40 have spaced apart walls 48 and 50, with the wall 50 aligning in an acute angle with respect to the top surface 34 of the yoke.

A U-shaped spring 52 is provided and includes a pair of spaced apart legs 54 and 56 which are interconnected by a connecting crosspiece 58 at one end portion thereof. The intermediate portions 55,57 of the legs 54 and 56 are bent at an angle so that the remote end portions 59 and 60 of the legs 54 and 56 form an acute angle with respect to the axis of the legs 54 and 56. Parts 63,65 of the end portions 59,60 of the legs 54 and 56 are bent back upon portions 59,60 so as to form U-shaped portions with the bent back parts 63,65 lying parallel to the portions 59 and 60. The parts 63,65 and end portions 59,60, respectively, lie in planes containing the axis of the legs 54 and 56, which planes lie parallel to each other. To assemble the spring 52 with the yoke, the end portions 59,60 are aligned with the channels 38 and 40 and are driven into said channels 38 and 40 until the ends of the parts 63,65 of the spring bite into the walls 50 of the channels 38 and 40. At that point, the bent intermediate portions 55,57 of the legs 54 and 56 cut across the aperture 42 generally along a chord of the aperture with the legs 54 and 56 disposed close to or on the surface of the portion 36 of the cavity 32 and with the crosspiece 58 lying in the portion 36 and below the plane of the top wall 34 of the yoke.

A side pin 61, carried by the end of a windshield wiper arm (not shown), has a reduced diameter portion 62 which is bounded by an enlarged outer end portion 64 and an enlarged inner end portion 66 so that the reduced diameter portion has abutting shoulders defining each end thereof. With the pin 61 inserted in the aperture 42, the tapered outer end portion 64 of the pin will force first the leg 54 and then the leg 56 upwardly with respect to the aperture 42 to permit the pin 61 to pass through the aperture 42. When the shoulder adjacent the outer end portion 64 of the pin passes the leg 54, the leg 54 will drop down into the reduced diameter portion 62 and, upon further pushing of the pin, the end portion 64 of the pin will clear the second leg 56 whereupon the second leg of the pin will drop into the reduced diameter portion 62. The two legs 54 and 56 are now positioned in the reduced diameter portion 62 of the pin 61 and bear against the shoulders at the opposite ends of the reduced diameter portion 62 to prevent the pin 61 from being removed from the aperture 42 in the bridge or yoke of the blade. To remove the pin 61, crosspiece 58 is grasped by a screwdriver or other tool to pivot the pin to the dotted line position of FIG. 3 whereby the intermediate portion of the legs 54 and 56 are removed from alignment with the aperture 42 whereupon the pin 61 and the blade can be separated.

It should be apparent that in using the improved construction, should one leg of the spring rupture, the other leg of the spring will still retain the blade on the pin until appropriate remedial action can be taken. In addition, in assembling the blade on the pin 61, in the event the pin 61 is not pushed all the way into the blade, as long as the enlarged end portion 64 of the pin clears at least one leg 54 of the spring, the blade will be retained on the pin and will function to a limited extent. Due to the construction of the cavity 32 and the location of the pin 61 in the cavity, the pin is not able to work loose from the cavity 32 and release the pin 61 from the blade. The ends of the parts 63,65 of the legs 54,56 of the spring 52 will bite into the walls 50 of the channels 38,40 of the cavity 32 and retain the spring on the yoke.

We claim:

1. A windshield wiper blade assembly (10) releasably mountable on the side of a wiper arm having a laterally extending pin (61) with a reduced diameter portion (62) between an enlarged outer end portion (64) and an enlarged inner end portion (66), said blade (14) having:
    a pressure-distributing yoke member (16) molded of plastic and having parallel side walls (44,46) with an aperture (42) therethrough for receiving said laterally extending pin (61),
    a cavity (32) molded in the top of said yoke member (16) and having spaced apart channels (38,40) intersecting along a chord with said aperture (42) in said yoke,
    a U-shaped spring member (52) having parallel spaced apart legs (54,56) with the free ends of said legs secured in said channels (38,40) of said cavity (32), intermediate portions (55,57) of said legs (54, 56) extending in a chordal fashion across the aperture (42) in said yoke and tangentially bearing on the reduced diameter portion (62) of the pin (61), and said spring (52) having a connecting crosspiece (58) at the opposite end of the legs (54,56), said crosspiece (58) being seated in said cavity (32) so as to be recessed below the level of the yoke surface adjacent said cavity (32) when said spring (52) is bearing on said reduced diameter portion (62) of the pin (61) and further being adapted to be raised for moving the intermediate portions (55,57) of the spring (52) out of alignment with the aperture (42) to release the pin (61) for removal of the blade.

2. A wiper blade assembly (10) as claimed in claim 1 wherein each of said legs (54, 56) has an end portion (59,60) which is straight except for a bend causing it to double back upon itself in a U-shaped fashion, and wherein the extreme end of each end portion bites into the wall (50) of the associated channel (38,40) of said cavity (32) to lock the leg to the yoke.

3. A windshield wiper blade assembly (10) having:
    a pressure-distributing yoke member (16) molded of plastic and having parallel side walls (44, 46) with an aperture (42) therethrough,
    a cavity (32) molded into the top of said yoke member and having spaced apart branches (38,40) intersecting with said aperture (42) in said yoke (16),
    a U-shaped spring member (52) having parallel spaced apart legs (54,56) with the free ends (59,60) of said legs (54,56) secured in said branches (38,40) of said cavity (32), intermediate portions (55,57) of said legs (54,56) extending in a chordal fashion across the aperture (42) in said yoke, and said spring (52) having a connecting crosspiece (58) at the opposite end of the legs (54,56), said crosspiece (58) being adapted to be raised for moving the intermediate portions of the spring (52) out of alignment with the aperture (42) in the yoke and being entirely seated within said cavity (32) when said intermediate portions (55,57) of the spring are in alignment with the aperture (42) in the yoke.

4. A wiper blade assembly (10) as claimed in claim 3 wherein each of said legs (54, 56) has an end portion (59,60) which is straight except for a bend causing it to double back upon itself in a U-shaped fashion, and wherein the extreme end of each end portion bites into the wall (50) of the associated channel (38,40) of said cavity (32) to lock the leg to the yoke.

* * * * *